H. L. MOSIER.
FRUIT PICKER.
APPLICATION FILED OCT. 25, 1909.
972,900.
Patented Oct. 18, 1910.
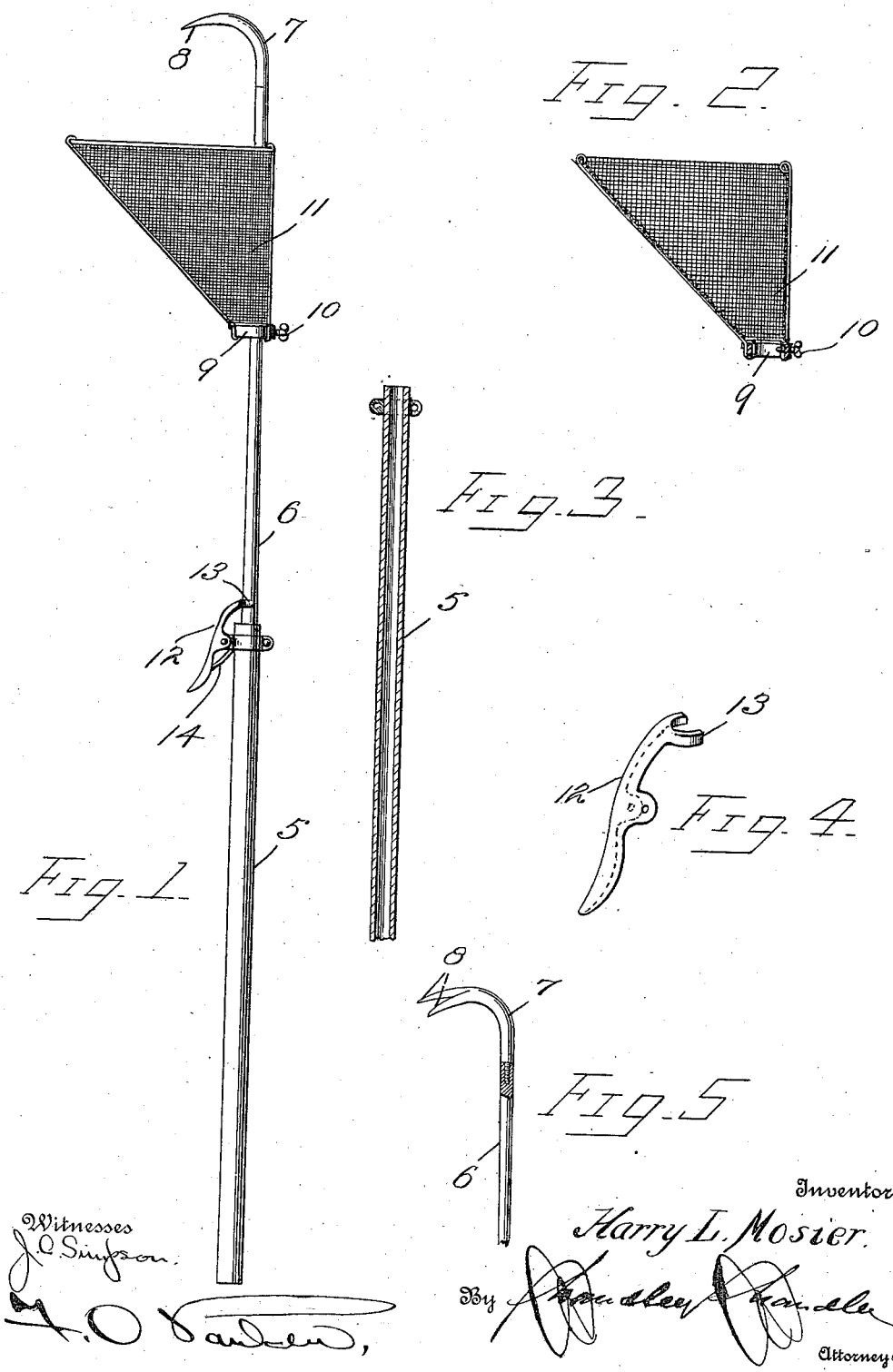

UNITED STATES PATENT OFFICE.

HARRY L. MOSIER, OF KELLER, TEXAS.

FRUIT-PICKER.

972,900.  Specification of Letters Patent.  Patented Oct. 18, 1910.

Application filed October 25, 1909. Serial No. 524,500.

*To all whom it may concern:*

Be it known that I, HARRY L. MOSIER, a citizen of the United States, residing at Keller, in the county of Tarrant, State of Texas, have invented certain new and useful Improvements in Fruit-Pickers; and I do hereby declare the following to be a full, clear, and exact description of the invention, such as will enable others skilled in the art to which it appertains to make and use the same.

The invention relates to a fruit picker and more particularly to the class of devices for gathering fruit from growing trees.

The primary object of the invention is the provision of a device in which fruit may be readily and quickly picked from a tree without possibility of injuring the same or the tree.

Another object of the invention is the provision of a device of this character in which a fruit receiver is mounted upon an adjustable standard so that fruit upon a tree may be gathered without injury to the fruit and thus preventing the same from dropping to the ground whereby it would become bruised and unfit for the market.

A further object of the invention is the provision of a device of this character in which the staff may be adjusted to any desirable length to give the required reach thereto so that the fruit upon the tree may be gathered in a convenient manner.

A still further object of the invention is the provision of a device of that character which is simple in construction, thoroughly reliable and efficient in operation and inexpensive in the manufacture.

With these and other objects in view, the invention consists in the construction, combination and arrangement of parts, as will be hereinafter more fully described, illustrated in the accompanying drawings, which disclose the preferred form of embodiment of the invention to enable those skilled in the art to practice the same, and as pointed out in the claim hereunto appended.

In the drawings:—Figure 1 is a side elevation of the device constructed in accordance with the invention. Fig. 2 is a vertical sectional view through the receiver. Fig. 3 is a fragmentary sectional view of the standard or pole. Fig. 4 is a detail perspective view of the locking member. Fig. 5 is a detail perspective view of a portion of the picker terminal of the adjustable rod.

Similar reference characters indicate corresponding parts throughout the several views in the drawings.

Referring to the drawings by numerals 5 designates a pole forming a handle portion having a longitudinal bore therethrough in which is slidably mounted a rod 6, the latter having in its upper end detachably fitted a curved neck 7, terminating in a fork providing picker fingers or tines 8, by means of which the fruit is severed from a tree. It being understood of course that these fingers 8 are spaced apart to the required extent and as many may be employed as found necessary or as the size of the fruit to be picked may require.

Surrounding the rod 6, and longitudinally slidable thereon is a collar 9, and is held adjustably secured thereto by means of a set screw 10, which latter permits the proper adjustment of the collar when required. Directly above this collar and suitably secured to the rod 6 is a wire mesh basket 11, of substantially hopper-shape to provide an enlarged mouth portion relative to its contracted bottom. This basket 11, has connection with the collar 9, so that upon adjustment of the latter the basket may be brought nearer to or a considerable distance removed from the picker fingers 8, should the occasion demand.

Pivoted to a collar at the upper end of the handle 5 is a locking member 12, the latter having a forked engaging end 13, to engage with the rod 6, to hold it in adjusted position and this forked engaging end 13, of the lever 12, is normally held in engagement with the rod 6 by means of a spring 14, carried by the said lever. It is obvious that by depressing the lever the forked engaging end 13 will be released from the rod 6, so as to permit the latter to be adjusted in the handle and in this manner the length of the device is increased or decreased.

What is claimed is:—

The herein described fruit picker comprising a tubular handle, a rod loosely telescoping in said handle and having a goose neck at its upper end terminating in outwardly diverging pointed fingers, a basket adjustably supported on said rod whereby it may be moved toward or away from the said goose neck, a collar clamped to the handle near its end receiving the rod, and a spring controlled lever pivoted to said collar and having a forked end frictionally engaging the rod to normally hold it in adjusted position relative to the handle.

In testimony whereof, I affix my signature, in presence of two witnesses.

HARRY L. MOSIER.

Witnesses:
W. S. HART,
E. T. READ.